United States Patent
Lin

(10) Patent No.: US 6,216,762 B1
(45) Date of Patent: Apr. 17, 2001

(54) SUN-SHADE DEVICE

(76) Inventor: Paul Lin, No. 8, Lane 762, Chung-Shan N. Rd., Yung-Kang City, Tainan Hsien (TW)

(*) Notice: Subject to any disclaimer, the term of this patent is extended or adjusted under 35 U.S.C. 154(b) by 0 days.

(21) Appl. No.: 09/587,706

(22) Filed: Jun. 5, 2000

(51) Int. Cl.$^7$ .................................................. E04F 10/60
(52) U.S. Cl. ........................................ 160/370.22; 160/70
(58) Field of Search ............................. 160/370.22, 22, 160/66, 69, 70, 78, 79, 310; 296/97.8

(56) References Cited

U.S. PATENT DOCUMENTS

| | | | |
|---|---|---|---|
| 4,836,263 | * 6/1989 | Ament | 160/68 X |
| 5,468,040 | * 11/1995 | Hsieh et al. | 160/370.22 X |
| 5,653,278 | * 8/1997 | Cheng | 160/370.22 |
| 5,896,910 | * 4/1999 | Chen | 160/370.22 |
| 6,032,718 | * 3/2000 | Chen | 160/370.22 |
| 6,135,192 | * 10/2000 | Suzuki et al. | 160/370.22 |

* cited by examiner

*Primary Examiner*—David M. Paul
(74) *Attorney, Agent, or Firm*—Christie, Parker & Hale, LLP

(57) ABSTRACT

A sun-shade device includes an elongate housing formed with a slit, a roller journalled in the housing, a screen wound around the roller and having an upper edge which extends out of the housing via the slit and which is provided with a horizontal strip, a biasing member provided in the housing for biasing the roller to rotate in a direction for winding the screen on the roller, and left and right stretching arm units, each of which includes an upper arm member having an upper first end pivoted to the horizontal strip and a lower second end, and a lower arm member having an upper third end pivoted to the second end of the upper arm member, a lower fourth end, and a mounting portion formed between the third and fourth ends and mounted pivotally on the housing. A drive unit is connected to the fourth ends of the lower arm members for driving pivoting movement of the upper and lower arm members so as to stretch or retract the screen. The third end of each lower arm member is formed with a pin projection that engages an engaging groove formed in the second end of the adjacent upper arm member when the upper arm member is aligned with the lower arm member and is stretched from the lower arm member.

5 Claims, 6 Drawing Sheets

SUN-SHADE DEVICE

BACKGROUND OF THE INVENTION

1. Field of the Invention

The invention relates to a sun-shade device, more particularly to a sun-shade device which includes a stretching arm unit with upper and lower arm members that are aligned with each other when a screen thereof is fully stretched.

2. Description of the Related Art

A sun-shade device is commonly installed in an automobile adjacent to a rear window for shading the interior of the automobile from sunlight. FIGS. 1 and 2 show a conventional sun-shade device 1 which includes an elongate housing 11 secured in the automobile, an elongate roller 12 journalled in the housing 11, a screen 13 wound on the roller 12 and having an upper edge which extends out of the housing 11 and which is provided with an elongate frame member 15, a torsion spring 14 provided in the housing 11 for biasing the roller 12 to rotate in a direction for winding the screen 13 on the roller 12, a pair of stretching arms 16 mounted on two opposite ends of the housing 14 for stretching the screen 13 out of the housing 14, and a drive unit 17 for driving movement of the stretching arms 16. The frame member 15 on the upper edge of the screen 13 is formed with a longitudinally extending slide groove 151 that opens downwardly. Each of the stretching arms 16 has a lower end portion mounted pivotally on the housing 14 and an upper end portion formed with a sliding block 161 which extends into and which is slidable along the slide groove 151. The drive unit 17 includes a gear member 171 which can be driven by a motor (not shown) and which engages a pair of transmission shafts 18 that are connected respectively and pivotally to the lower end portions of the stretching arms 16. When the motor is activated to drive rotation of the gear member 171, the stretching arms 16 are moved by the transmission shafts 18 to pivot upwardly and downwardly relative to the housing 14 for winding and unwinding the screen 13. However, it is noted that the stretching arms 16 are designed to be inclined relative to a vertical line and to extend toward a central part of the screen 13 when the screen 13 is fully stretched so as to permit smooth operation of the stretching arms 16 when the drive unit 17 is subsequently activated for winding the screen 13. The conventional sun-shade device is thus not satisfactory.

SUMMARY OF THE INVENTION

Therefore, the object of the present invention is to provide a sun-shade device with a modified stretching arm unit having upper and lower arm members that are aligned with each other when a screen is fully stretched.

Accordingly, the sun-shade device of the present invention includes an elongate housing having a top side formed with a longitudinally extending slit, and opposite first and second end portions, an elongate roller journalled in the housing and rotatable about a longitudinal axis thereof, a screen having a lower edge connected to the roller and an upper edge which extends out of the housing via the slit and which is provided with a horizontal strip that has opposite first and second end portions, a biasing member provided in the housing for biasing the roller to rotate in a direction for winding the screen on the roller, left and right stretching arm units, and a drive unit. Each of the stretching arm units includes an upper arm member having an upper first end connected pivotally to a respective one of the first and second end portions of the horizontal strip about a horizontal first pivot axis transverse to the longitudinal axis of said roller, and a lower second end, and a lower arm member having an upper third end connected pivotally to the second end of the upper arm member about a horizontal second pivot axis parallel to the first pivot axis, a lower fourth end, and a mounting portion formed between the third and fourth ends and mounted pivotally on a respective one of the first and second end portions of the housing about a horizontal third pivot axis parallel to the first and second pivot axes. The drive unit is mounted on the housing, and is connected to the fourth ends of the lower arm members of the stretching arm units for driving the fourth end of the lower arm member of each of the stretching arm units to pivot about the third pivot axis in a first direction toward the other one of the stretching arm units, thereby causing the upper arm members to pivot relative to the lower arm members and the horizontal strip for stretching from the lower arm members and for unwinding the screen from the roller. The drive unit further drives the fourth end of the lower arm member of each of the stretching arm units to pivot about the third pivot axis in a second direction away from the other one of the stretching arm units, thereby causing the upper arm members to pivot relative to the lower arm members and the horizontal strip for folding toward the lower arm members so as to permit retraction of the screen into the housing and winding of the screen around the roller due to biasing action of the biasing member. The third end of the lower arm member of each of the stretching arm units is formed with a pin projection that projects in a direction parallel to the second pivot axis. The second end of the upper arm member of each of the stretching arm units is formed with an engaging groove which engages the pin projection when the upper arm member is aligned with the lower arm member and is stretched from the lower arm member.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
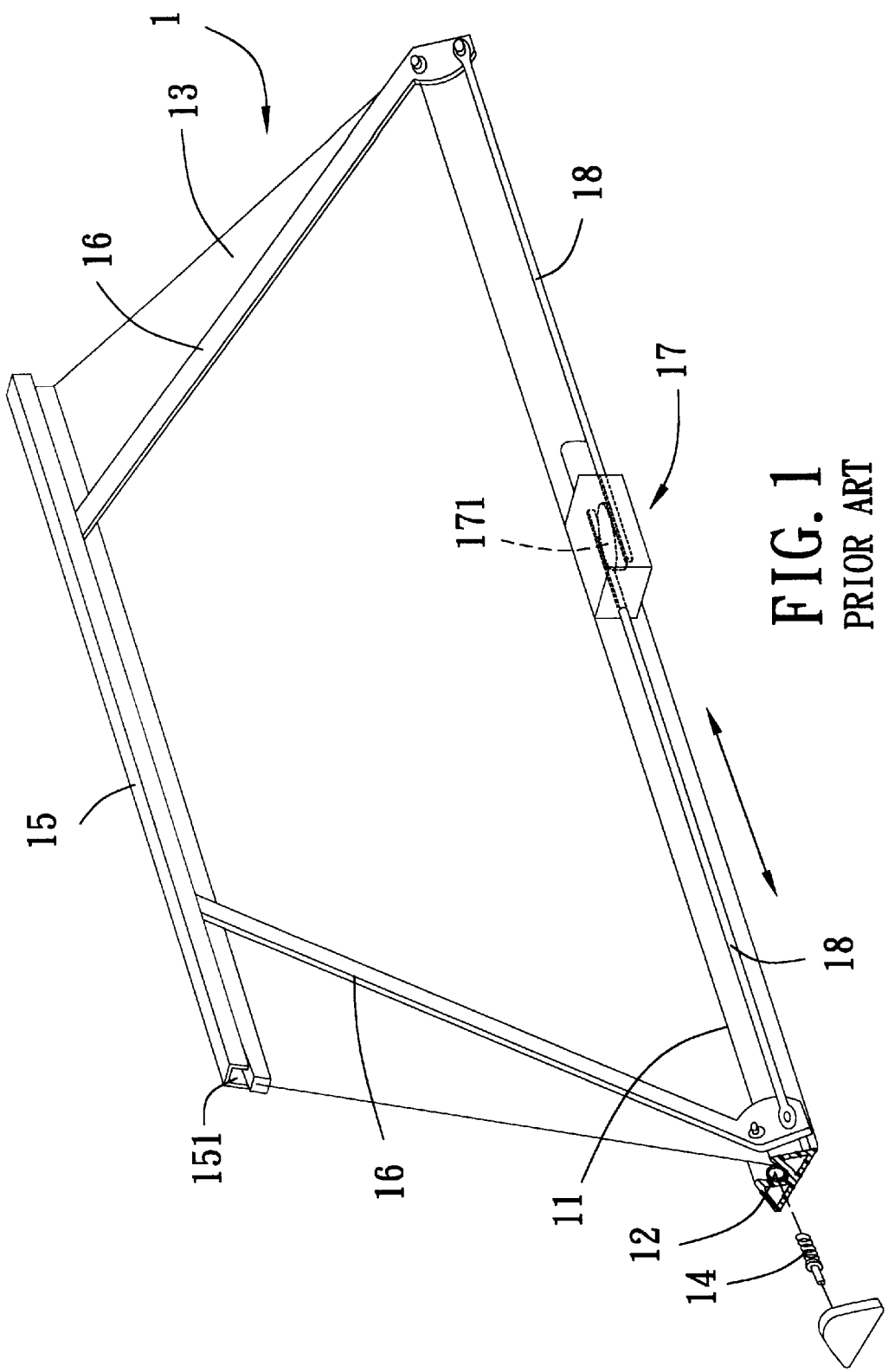
FIG. 1 is a perspective view of a conventional sun-shade device.
Figure 2:
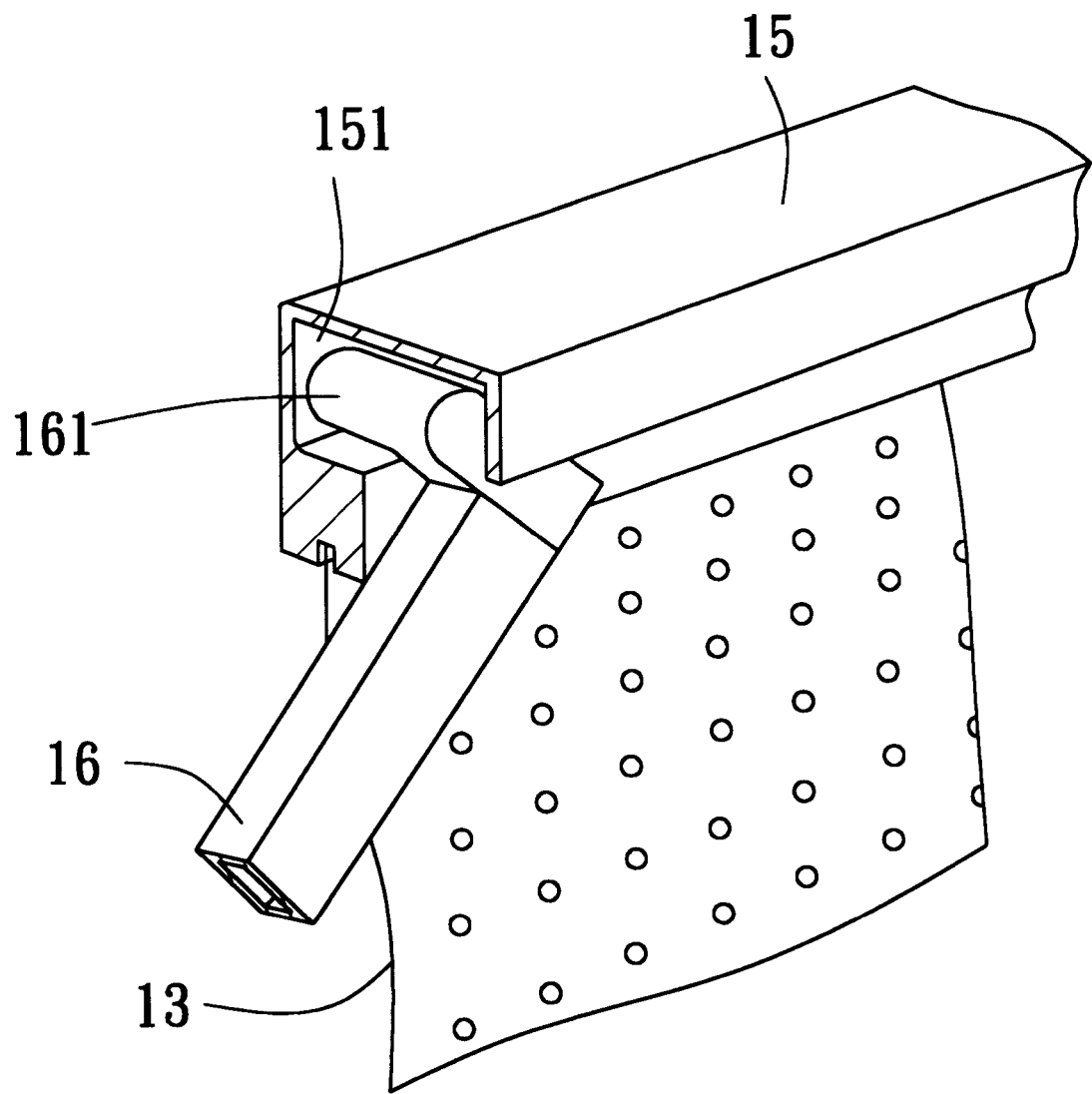
FIG. 2 is an enlarged fragmentary perspective view illustrating sliding connection between a stretching arm and an elongate frame member on an upper edge of a screen of the conventional sun-shade device.
Figure 3:
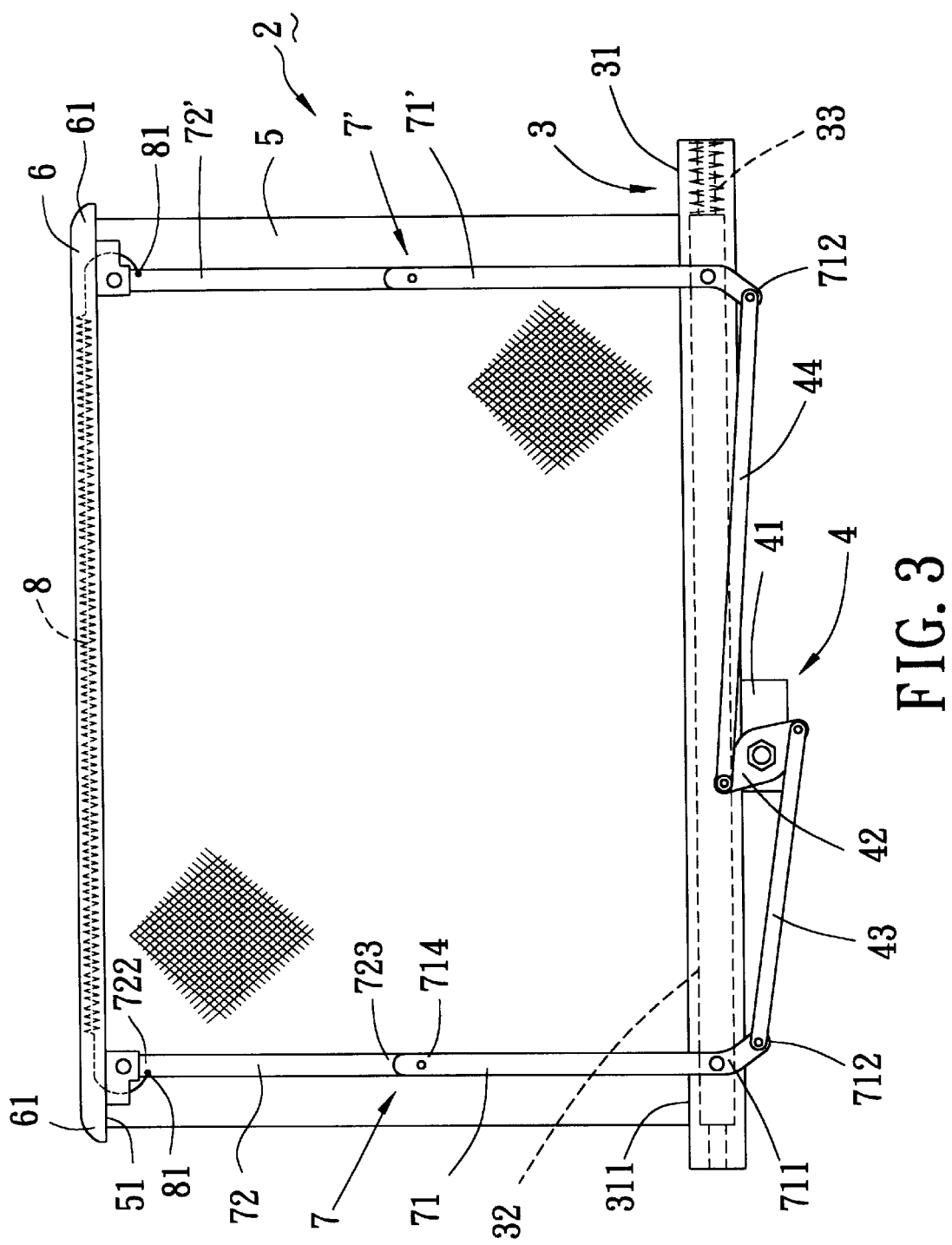
FIG. 3 is a schematic view of a preferred embodiment of the sun-shade device of the present invention when a screen thereof is fully stretched.

Referring to FIG. 3, the preferred embodiment of the sun-shade device 2 of the present invention is shown to include a winding unit 3, a drive unit 4, a screen 5, and left and right stretching arm units 7, 7'.

The winding unit 3 includes an elongate housing 31 adapted to be secured in an automobile adjacent to a window of the latter. The housing 31 has a top side formed with a longitudinally extending slit 311. An elongate roller 32 is journalled in the housing 33 and is rotatable about a longitudinal axis thereof. The screen 5 has a lower edge connected to the roller 32, and an upper edge 51 which extends out of the housing 31 via the slit 311 and which is provided with a horizontal strip 6. A first biasing spring 33, which is in the form of a torsion spring, is provided in the housing 31 for biasing the roller 32 to rotate in a direction for winding the screen 5 on the roller 32.

Figure 4:
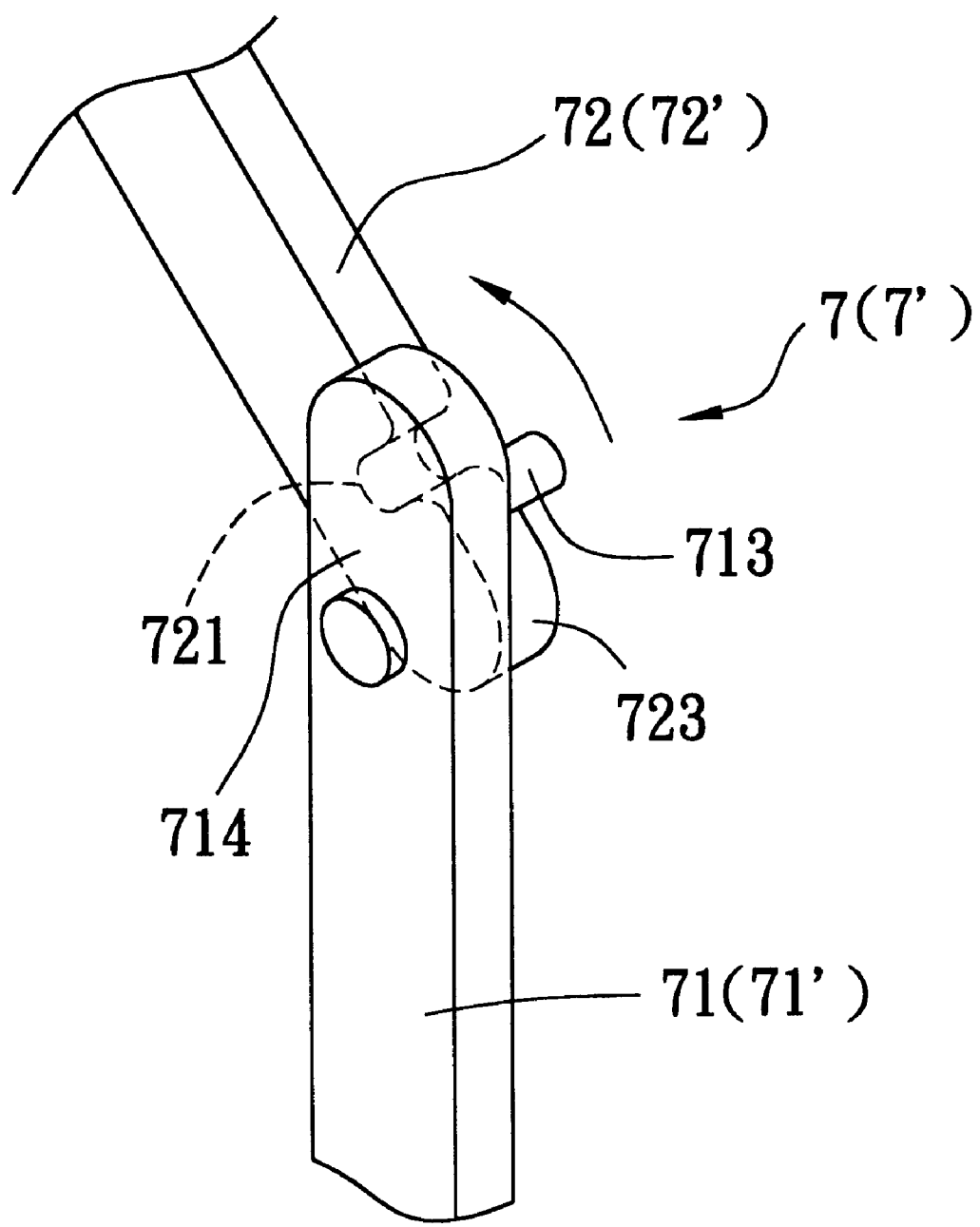
FIG. 4 is an enlarged fragmentary perspective view illustrating a stretching arm unit of the preferred embodiment.

Each of the left and right stretching arm units 7, 7' includes an upper arm member 72, 72' and a lower arm member 71, 71' connected to the upper arm member 72, 72'. The upper arm member 72, 72' has an upper first end 722 connected pivotally to a respective one of two opposite end portions 61 of the horizontal strip 6 about a horizontal first pivot axis transverse to the longitudinal axis of the roller 32, and a lower second end 723. The lower arm member 71, 71' has an upper third end 714 connected pivotally to the lower second end 723 of the corresponding upper arm member 72, 72' about a horizontal second pivot axis parallel to the first pivot axis, a lower fourth end 712, and a mounting portion 711 formed between the third and fourth ends 714, 712 and proximate to the fourth end 712. The mounting portion 711 is mounted pivotally on a respective one of the opposite end portions of the housing 31 about a horizontal third pivot axis parallel to the first and second pivot axes. The fourth end 712 of the lower arm member 71, 71' is bent toward the other one of the stretching arm units 7, 7'. As shown in FIG. 4, the third end 714 of the lower arm member 71, 71' of each of the stretching arm units 7, 7' is formed with a pin projection 713 which projects in a direction parallel to the second pivot axis. The second end 723 of the upper arm member 72, 72' of each of the stretching arm units 7, 7' is formed with an engaging groove 721 for engaging the pin projection 713.

Referring back to FIG. 3, a second biasing member 8, which is in the form of an elongate tension spring, is provided on the horizontal strip 6 and extends along the same. The second biasing member 8 has two opposite end portions 81, each of which extends to a lateral outer side of a respective one of the stretching arm units 7, 7' opposite to the other one of the stretching arm units 7, 7', and is hooked at the first end 722 of the upper arm member 72, 72' of the respective stretching arm unit 7, 7' at a point below the first pivot axis for applying a biasing force to the upper arm member 72, 72' so as to assist pivoting movement of the upper arm member 72, 72' relative to the horizontal strip 6 to facilitate stretching of the upper arm members 72, 72' from the lower arm members 71, 71'.

The drive unit 4 includes a vertically disposed rotary plate 42 having upper and lower ends and a central portion between the upper and lower ends, a first linking rod 43 interconnecting the lower end of the rotary plate 42 and the fourth end 712 of the lower arm member 71 of the left stretching arm unit 7, a second linking rod 44 interconnecting the upper end of the rotary plate 42 and the fourth end 712 of the lower arm member 71' of the right stretching arm unit 7', and a driving source, in the form of a motor 41 that is mounted on the housing 31 between the end portions of the same. The motor 41 is coupled to and drives the rotary plate 42 to rotate about a horizontal rotary axis that passes through the central portion of the rotary plate 42 and that is transverse to the longitudinal axis of the roller 32.

Figure 5:
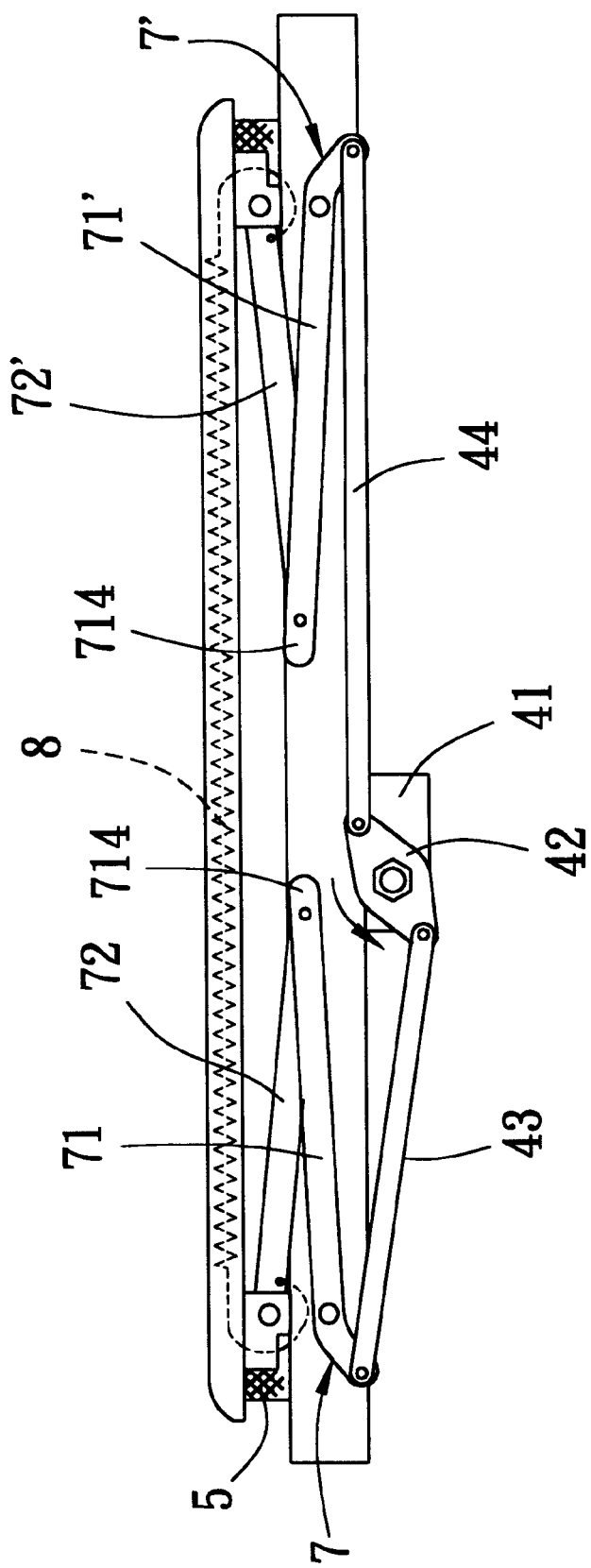
FIG. 5 is a schematic view of the preferred embodiment when the screen is retracted.
Figure 6:
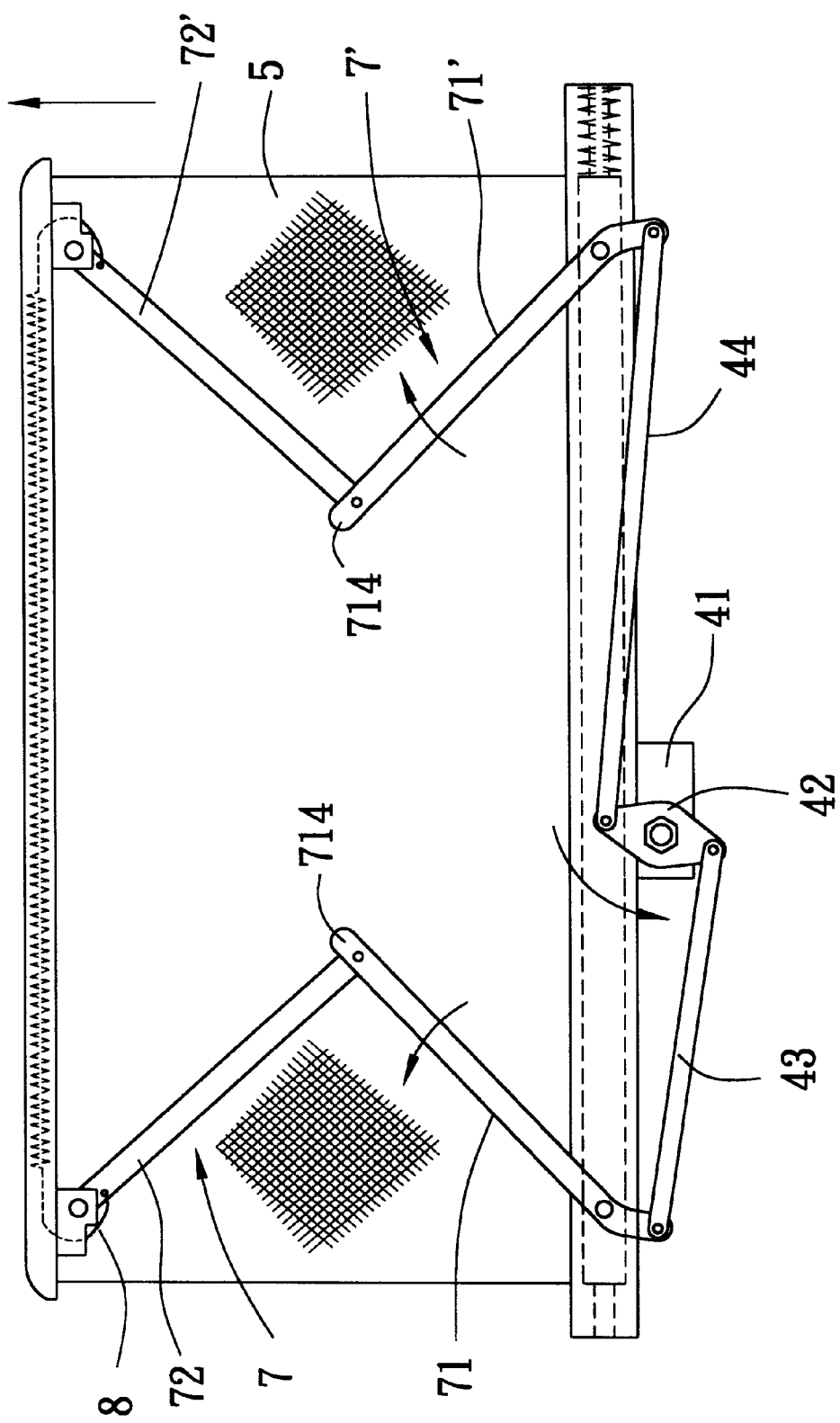
FIG. 6 is a schematic view of the preferred embodiment when operated for stretching the screen.

Referring to FIGS. 5 and 6, when it is desired to stretch the screen 5, the motor 41 is activated to rotate the rotary plate 42 about the rotary axis in a counter-clockwise direction to result in corresponding rightward movement of the first linking rod 43 and leftward movement of the second linking rod 44. At this time, the lower arm member 71 of the left stretching arm unit 7 is moved by the first linking rod 43 to cause the third end 714 to pivot about the third pivot axis in a counter-clockwise direction, thereby causing the upper arm member 72 to move upwardly and to pivot relative to the lower arm member 71 and the horizontal strip 6 for stretching from the lower arm member 71 of the left stretching arm unit 7. Simultaneously, the lower arm member 71' of the right stretching arm unit 7' is moved by the second linking rod 44 to cause the third end 714' thereof to pivot about the third pivot axis in a clockwise direction, thereby causing the upper arm member 72' to move upwardly and to pivot relative to the lower arm member 71' and the horizontal strip 6 for stretching from the lower arm member 71'. The screen 5 is thus stretched by the left and right stretching arm units 7, 7'. As the second biasing member 8 is extended when the screen 5 is retracted, the second biasing member 8 thus applies a biasing force to each of the upper arm members 72, 72' so as to assist pivoting movement of the upper arm members 72, 72' relative to the horizontal strip 6 to facilitate stretching of the upper arm members 72, 72' from the lower arm members 71, 71'. The motor 41 is deactivated when the upper arm members 72, 72' are aligned with the lower arm members 71, 71', respectively. At this time, the pin projection 713 (see FIG. 4) on the third end 714 of the lower arm member 71, 71' of each of the stretching arm units 7, 7' moves into and engages the engaging groove 721 in the second end 723 of the upper arm member 72, 72' of the respective stretching arm unit 7, 7' so as to prevent further pivoting movement of the upper and lower arm members 72, 72', 71, 71' and to position the upper and lower arm members 72, 72', 71, 71' in an aligned state with each other.

When it is desired to retract the screen 5, the motor 41 is activated to rotate the rotary plate 42 about the rotary axis in a clockwise direction to result in corresponding leftward movement of the first linking rod 43 and rightward movement of the second linking rod 44. At this time, the lower arm member 71 of the left stretching arm unit 7 is moved by the first linking rod 43 to cause the third end 714 thereof to pivot about the third pivot axis in a clockwise direction, thereby causing the upper arm member 72 of the left stretching arm unit 7 to move downwardly and to pivot relative to the lower arm member 71 and the horizontal strip 6 for folding toward the lower arm member 71. Simultaneously, the lower arm member 71' of the right stretching arm unit 7' is moved by the second linking rod 44 to cause the third end 714 thereof to pivot about the third pivot axis in a counter-clockwise direction, thereby causing the upper arm member 72' of the right stretching arm unit 7' to move downwardly and to pivot relative to the lower arm member 71' and the horizontal strip 6 for folding toward the lower arm member 71'. The screen 5 is thus retracted into the housing 3, and is wound around the roller 32 due to the biasing action of the first biasing member 33.

It has thus been shown that the stretching arm units 7, 7' of the sun-shade device of the present invention permit alignment of the upper arm members 72, 72' with the lower arm members 71, 71' once the screen 5 is fully stretched.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A sun-shade device comprising:

an elongate housing having a top side formed with a longitudinally extending slit, and opposite first and second end portions;

an elongate roller journalled in said housing and rotatable about a longitudinal axis thereof;

a screen having a lower edge connected to said roller and an upper edge which extends out of said housing via said slit and which is provided with a horizontal strip that has opposite first and second end portions;

a first biasing member provided in said housing for biasing said roller to rotate in a direction for winding said screen on said roller;

left and right stretching arm units, each of which includes an upper arm member having an upper first end connected pivotally to a respective one of said first and second end portions of said horizontal strip about a horizontal first pivot axis transverse to the longitudinal axis of said roller, and a lower second end, and a lower arm member having an upper third end connected pivotally to said second end of said upper arm member about a horizontal second pivot axis parallel to the first pivot axis, a lower fourth end, and a mounting portion formed between said third and fourth ends and mounted pivotally on a respective one of said first and second end portions of said housing about a horizontal third pivot axis parallel to the first and second pivot axes; and a drive unit mounted on said housing and connected to said fourth ends of said lower arm members of said left and right stretching arm units for driving said fourth end of said lower arm member of each of said stretching arm units to pivot about the third pivot axis in a first direction toward the other one of said stretching arm units, thereby causing said upper arm members to pivot relative to said lower arm members and said horizontal strip for stretching from said lower arm members and for unwinding said screen from said roller, said drive unit further driving said fourth end of said lower arm member of each of said stretching arm units to pivot about the third pivot axis in a second direction away from the other one of said stretching arm units, thereby causing said upper arm members to pivot relative to said lower arm members and said horizontal strip for folding toward said lower arm members so as to permit retraction of said screen into said housing and winding of said screen on said roller due to biasing action of said first biasing member;

said third end of said lower arm member of each of said stretching arm units being formed with a pin projection that projects in a direction parallel to the second pivot axis, said second end of said upper arm member of each of said stretching arm units being formed with an engaging groove which engages said pin projection when said upper arm member is aligned with said lower arm member and is stretched from said lower arm member.

2. The sun-shade device of claim 1, further comprising a second biasing member mounted on said horizontal strip and connected to said first ends of said upper arm members of said stretching arm units for providing a biasing force to assist pivoting movement of said upper arm members relative to said horizontal strip so as to facilitate stretching of said upper arm members from said lower arm members.

3. The sun-shade device of claim 2, wherein each of said stretching arm units has a lateral outer side opposite to the other one of said stretching arm units, said second biasing member being formed as an elongate tension spring with two opposite end portions, each of said end portions of said second biasing member extending to said lateral outer side of a respective one of said stretching arm units and being hooked at said first end of said upper arm member of the respective one of said stretching arm units at a point below said first pivot axis.

4. The sun-shade device of claim 1, wherein said drive unit includes:

a rotary plate disposed rotatably between said first and second end portions of said housing, said rotary plate having upper and lower ends and a central portion between said upper and lower ends, said rotary plate being rotatable about a horizontal rotary axis that passes through said central portion thereof and that is transverse to the longitudinal axis of said roller;

a first linking rod interconnecting said lower end of said rotary plate and said fourth end of said lower arm member of said left stretching arm unit;

a second linking rod interconnecting said upper end of said rotary plate and said fourth end of said lower arm member of said right stretching arm unit; and a driving source mounted on said housing and coupled to said rotary plate for driving said rotary plate to rotate about said rotary axis in a counter-clockwise direction for causing said fourth end of said lower arm member of each of said stretching arm units to pivot about said third pivot axis in the first direction, said driving source further driving said rotary plate to rotate about said rotary axis in a clockwise direction for causing said fourth end of said lower arm member of each of said stretching arm units to pivot about said third pivot axis in the second direction.

5. The sun-shade device of claim 1, wherein said fourth end of said lower arm member of each of said stretching arm units is bent toward the other one of said stretching arm units.

* * * * *